United States Patent [19]

Hartman et al.

[11] Patent Number: 4,636,646

[45] Date of Patent: Jan. 13, 1987

[54] OPFET PHOTODETECTOR

[75] Inventors: Davis H. Hartman, Tempe; Fred V. Richard, Scottsdale, both of Ariz.

[73] Assignee: Motorola, Inc., Schaumburg, Ill.

[21] Appl. No.: 653,121

[22] Filed: Sep. 21, 1984

[51] Int. Cl.$^4$ .............................................. G02B 27/00
[52] U.S. Cl. .................................. 250/551; 250/211 J; 250/227
[58] Field of Search ................... 250/211 J, 227, 551; 357/19, 22; 455/610, 612; 350/96.15, 96.17

[56] References Cited

U.S. PATENT DOCUMENTS

| | | | |
|---|---|---|---|
| 3,952,265 | 4/1976 | Hunsperger | 250/551 |
| 4,005,312 | 1/1977 | Lemelson | 250/551 |
| 4,110,781 | 8/1978 | Konishi et al. | 250/551 |
| 4,137,543 | 1/1979 | Beneking | 357/19 |
| 4,194,162 | 3/1980 | Uematsu et al. | 350/96.17 |
| 4,210,923 | 7/1980 | North et al. | 350/96.17 |
| 4,240,088 | 12/1980 | Myers | 250/551 |
| 4,294,510 | 10/1981 | Chappell | 350/96.17 |
| 4,350,993 | 9/1982 | Wieder | 357/22 |

Primary Examiner—David C. Nelms
Attorney, Agent, or Firm—Raymond J. Warren

[57] ABSTRACT

An apparatus and method is disclosed for providing a more efficient OPFET photodetector capable of handling a higher rate of data. The increased efficiency is provided by edge coupling an optical detector to a light source through an optical waveguide. A MESFET optical detector may be used with a Zinc Oxide channel waveguide.

5 Claims, 4 Drawing Figures

OPFET PHOTODETECTOR

BACKGROUND OF THE INVENTION

1. Field of the Invention

This invention relates, in general, to optical field effect transistors (OPFET) and, more particularly, to edge illuminated OPFET photodetectors.

2. Description of the Background

Typical OPFET photodetectors have an optic fiber butt coupled to the planar surface thereof to provide a light source. Butt coupling suffers from the fact that a significant fraction of the light is actually absorbed in the semi-insulating substrate, which is inherently slow in its photo-conductive properties. This light will then either dissipate, recombine, or produce electron-hole pairs which diffuse back into the channel. This diffusion into the channel causes the signal to be extended effectively reducing the frequency of the signals that may be transmitted. As a result, OPFET devices are characterized by both a low frequency and a high frequency response. This is not unusual, since even silicon PIN diodes have a difference between low and high frequency behavior. However, because of the inherently thin layers used in the GaAs MESFET devices, there is a very large difference between low and high frequency performance. In addition, the GaAs OPFET devices are by no means optimized for optical coupling from a single mode fiber.

SUMMARY OF THE INVENTION

Accordingly, it is an object of the present invention to provide an apparatus and method that will allow a higher data rate to be transmitted to an OPFET.

Another object of the present invention is to provide an apparatus and method that has increased quantum efficiency.

Still another object of the present invention is to provide an apparatus and method having an enhanced low/high frequency response.

Yet another object of the present invention is to provide an apparatus and method that is amenable to optical coupling from a single mode optic fiber.

The above and other objects and advantages of the present invention are provided by an apparatus and method of edge coupling a photodetector using a waveguide.

A particular embodiment of the present invention comprises an apparatus and method of having an optical detector mounted on a substrate and having a gate or a waveguide, of the detector coupled to the edge of the substrate through an optical waveguide.

BRIEF DISCUSSION OF THE DRAWINGS

DETAILED DESCRIPTION OF THE DRAWINGS

Figure 1:
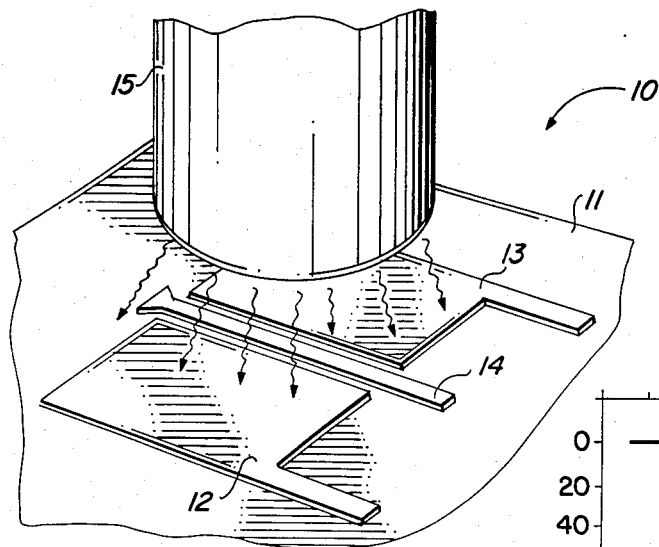
FIG. 1 is a perspective view of a prior art butt coupled OPFET.
Figure 2:
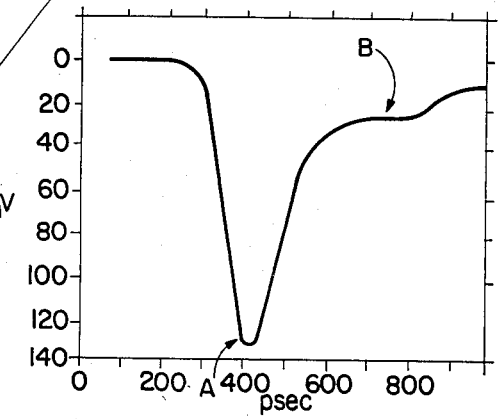
FIG. 2 is a graph of a pulse response of a prior art OPFET.

Referring to FIG. 1 a butt illuminated OPFET, generally designated 10, is illustrated. OPFET 10 consists of a substrate 11, a source 12, a drain 13 and a gate 14. An optical fiber 15 is shown illuminating OPFET 10. As is illustrated, in addition to illuminating gate 14 much of the light will be transmitted to other various portions of OPFET 10 which will not be utilized. In addition, of the light that is transmitted to gate 14, much of the light may pass through gate 14 and penetrate substrate 11. Some of the light passing into substrate 11 will then recombine in gate 14 and be transmitted. This is illustrated in the pulse response of FIG. 2. Point A of FIG. 2 is illustrative of the initial light pulse received from fiber 15. Point B illustrates the tail that is caused by the transmission of the portion of the light signal that is originally transmitted into the substrate and later recombined in gate 14. The tail of the signal effectively reduces the frequency of the signals that may be transmitted. Operating at too high a frequency will cause subsequent signals to overlap the tail of the preceding signal thereby distorting the signal and giving erroneous results.

Figure 3:
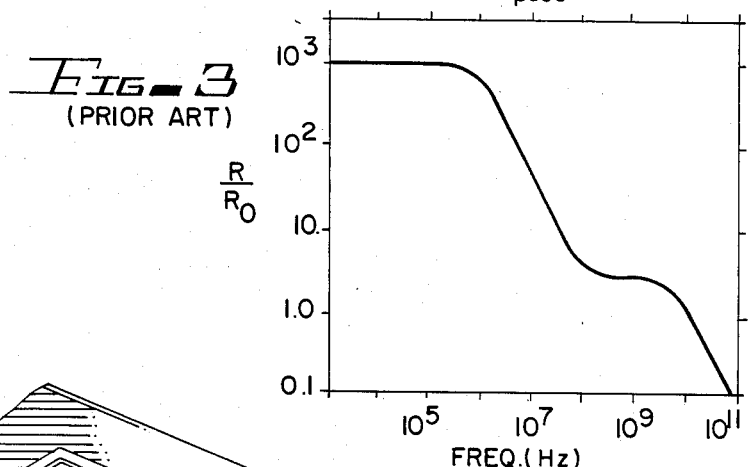
FIG. 3 is a graph of a relative response of an OPFET.

Referring now to FIG. 3 a graph of the relative responsiveness of a prior art metal semiconductor FET (MESFET) photodetector is illustrated. As indicated in FIG. 3 there exists a large discrepancy between the low and high frequency responses. Having a difference between low and high frequency responses is not unusual as even silicon PIN diodes exhibit this slightly. However, because of the inherently thin layers used in GaAs MESFET devices there is a very large difference in responses. Measurements have been made showing as much as 30 dB differences (see Gammell and Ballentyne, An Integrated Photoconductor Detector and Waveguide Structure, 36(2) APPL. PHYS. LETT. 149 (1980)).

Figure 4:
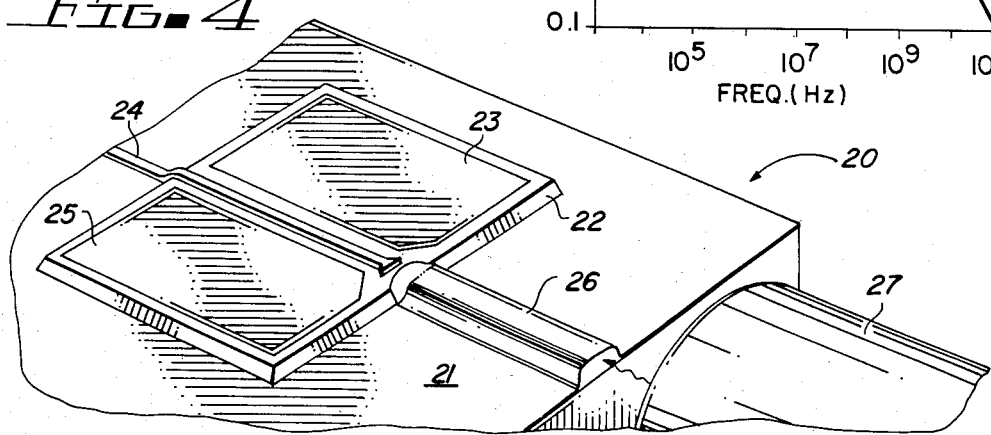
FIG. 4 is a perspective view of an OPFET embodying the present invention.

Referring now to FIG. 4 a perspective view of an OPFET, generally designated 20, embodying the present invention is illustrated. OPFET 20 consists of a substrate 21, made of Si or GaAs; a mesa 22; a source 23; a gate 24; a drain 25; and a waveguide 26. One approach to forming OPFET 20 is to take a semi-insulating GaAs material 21 and ion-plant an n-type material to a depth of several thousand angstroms. Next, material is etched away forming mesa 22 which isolates the transistor, such as formed by source 23, gate 24 and drain 25 on the present invention. Using this same technique a deposit of Zinc Oxide (ZnO) for channel waveguide 26 can be laid over substrate 21 where the N-channel implant has already been etched away and a passivation layer (not shown) that optically isolates the waveguide from the substrate has been laid down. OPFET 20 may then totally or partially be coated with a layer of superstrate material (not shown). Waveguide 26 leads from the gate 24 (MESFET) to the edge of OPFET 20. A fiber 27 is then placed on the end of waveguide 26 opposite the MESFET applying a light signal to waveguide 26. Using this technique almost all of the light will penetrate the channel of the MESFET laterally, allowing very little to be transmitted into the substrate thereby increasing the overall efficiency of the photoconductor. This eliminates the tail found in the prior art signals and allows higher frequency signals to be used. Further, this increases the quantum efficiency over the prior art as most of the light is transmitted and not lost in the substrate. In addition, edge coupling optimizes the high/low frequency response of the circuit by minimizing the low frequency response interference.

In addition to the above, the absorption length of GaAs is on the order of one micron (0.82 μm), this will allow a very small MESFET (typically a 20 micron gate width) to absorb all incident light. The small gate width will result in a low bias current (typically 200 μA) to be used, thereby enhancing the detector sensitivity when compared to the prior art.

It should be noted that the above examples, while described in specific terms, may have materials of equivalent characteristics substituted for those indicated.

The present invention enables light signals to be coupled into a detector/amplifier IC by edge coupling from a single mode fiber to the waveguide at the edge of a chip.

Thus, it is apparent that there has been provided in accordance with the invention, a device and method that fully satisfies the objects, aims and advantages set forth above.

It has been shown that the present invention provides an improved OPFET photo detector which is capable of handling higher frequency (or higher data rate) signals; has an increased quantum efficiency; has an enhanced low/high frequency response; and is amenable to optical coupling from a single mode optic fiber.

While the invention has been described in conjunction with specific embodiments thereof, it is evident that many alterations, modifications, and variations will be apparent to those skilled in the art in light of the foregoing description. Accordingly, it is intended to embrace all such alterations, modifications and variations in the appended claims.

We claim:

1. An OPFET photodetector comprising:
   a substrate;
   optical detecting MESFET for detecting an optical signal, said optical detecting MESFET being mounted on said substrate so as to present an edge perpendicular thereto, said optical detecting MESFET comprising:
   a gate being mounted on said substrate and having a first edge perpendicular to said substrate and coupled to said optical transmitting means;
   a drain being mounted on said substrate juxtaposed to and to one side of said gate; and
   a source being mounted on said substrate juxtaposed to and to a side of said gate opposite said drain; and
   optical transmitting means for transmitting an optical signal, said optical transmitting means being optically coupled to the edge of said optical detecting means for selectively utilizing a high frequency response characteristic of said OPFET and minimizing the generation of low frequency components of a response of said OPFET.

2. The OPFET of claim 1 wherein said optical tansmitting means comprises a Zinc Oxide waveguide.

3. The OPFET of claim 2 wherein said substrate is GaAs.

4. The OPFET of claim 3 which further comprises a superstrate covering said waveguide.

5. An OPFET photodetector comprising:
   a semi-insulating substrate;
   a MESFET optical detector formed on said semi-insulating substrate with an exposed edge perpendicular thereto; and
   a waveguide optically coupled to the exposed edge of said MESFET optical detector for selectively utilizing a high frequency response charactristics of said OPFET and minimizing the generation of a low frequency component of a response of said OPFET.

* * * * *